United States Patent

Arguimbau et al.

[15] 3,647,968

[45] Mar. 7, 1972

[54] AUDIOMETER EMPLOYING NARROW-BAND NOISE MASKING

[72] Inventors: Lawrence B. Arguimbau, Lancaster; Rufus L. Grason, Lincoln, both of Mass.

[73] Assignee: Grason–Stadler Company, Inc., West Concord, Mass.

[22] Filed: Mar. 24, 1970

[21] Appl. No.: 22,356

[52] U.S. Cl. ....................179/1 N

[51] Int. Cl. ....................A61b 5/12

[58] Field of Search ....................179/1 N, 15.55 R; 331/47

[56] References Cited

UNITED STATES PATENTS 2,753,397 7/1956 Zwislocki ....................179/1 N

*Primary Examiner*—Kathleen H. Claffy

*Assistant Examiner*—Douglas W. Olms

*Attorney*—Kenway, Jenney and Hildreth

[57] ABSTRACT

In the audiometer disclosed herein, a noise signal is employed for masking or preventing reception of a test tone in the ear opposite that which is being tested. The masking noise signal comprises a pair of noise sidebands centered on the test tone frequency with the test tone frequency itself being substantially suppressed. Further, the bandwidth of the noise signal is controlled as a function of the frequency of the test tone so as to substantially correspond with the critical range of masking frequencies.

13 Claims, 5 Drawing Figures

Patented March 7, 1972 3,647,968

2 Sheets-Sheet 1

INVENTORS
LAWRENCE B. ARGUIMBAU
RUFUS L. GRASON
BY
Kenway, Jenney & Hildreth
ATTORNEYS Patented March 7, 1972

3,647,968

2 Sheets-Sheet 2

INVENTORS
LAWRENCE B. ARGUIMBAU
RUFUS L. GRASON
BY
Kenway, Jenney & Hildreth
ATTORNEYS original noise frequencies, the test tone frequency itself and the original noise component frequencies being substantially suppressed. The output signal from modulator 45 will thus, as represented in FIG. 4, comprise a pair of noise sidebands centered on the test tone frequency, designated T. This process can also be considered to be heterodyning or mixing.

As a consequence of the modulation process, the bandwidth of each sideband will be equal to the bandwidth of the noise signal passed by the variable cutoff filter 17. This bandwidth is in turn determined by the amplitude of the DC control signal which, as described previously, is variable as a predetermined function of the test tone frequency. Accordingly, it can be seen that the bandwidth of the masking noise signal provided by the doubly balanced modulator 45 is itself a predetermined function of the test tone frequency. Preferably, the total bandwidth of the masking noise signal is about 1.5 times the critical bandwidth described previously. In this way, adequate masking is insured without applying large excesses of acoustic power to the subject.

As will be understood, the particular transfer function which prevails between the test tone frequency and the bandwidth of the masking noise signal can be appropriately predetermined by appropriately selecting the frequency weighting function and the response characteristics of the lamp-photocell combination which largely determine the control signal response of the variable cutoff filter 17. If desired, various nonlinear DC networks may be interposed in the path of the DC control signal before it is applied to the variable cutoff filter 17 in order to tailor the response to a desired characteristic, as will be apparent to those skilled in the art.

Since the amplifiers employed in the noise generator 35 will typically have some finite, low-frequency cutoff point, the original noise frequency spectrum will typically roll off as it approaches zero frequency and thus the masking noise signal spectrum will comprise a notch or absence of signal components closely adjacent the test tone frequency. This notch is desirable in that it minimizes interference and confusion between the test tone signal and the masking signal.

In the audiometer system illustrated in FIG. 5, the signal source apparatus of FIG. 1 is represented generally at 48. The oscillator 11 is automatically driven or scanned in conventional fashion by a scanning motor, as indicated at 50, so as to automatically cover a predetermined range of frequencies. The substantially pure test tone and the masking noise signal are each applied to a respective attenuator 51 and 53. The attenuators 51 and 53 are ganged together and are automatically operated, e.g., by a cam associated with the scanning motor 50, so as to automatically compensate, as a function of frequency, for normal hearing response. The test tone signal is then applied to a second attenuator 55 which is typically arranged so that it can be operated under the control of the test subject, e.g., so as to maintain the amplitude of the test tone substantially at the subject's threshold level. The attenuated signal is then applied to an earphone 60 which is applied to the ear being tested. The masking noise signal is then applied to a second earphone 61 through a respective second attenuator 57 so that the overall masking signal level may be set to an appropriate level by the operator of the audiometric apparatus.

As is also conventional, the setting of the oscillator 11 and the setting of the subject-controlled attenuator 15 may be applied to a recorder for generating a chart representing the hearing response of the ear under test as a function of frequency. Preferably, the calibration of the attenuator 55 is such that the chart is recorded directly in percent hearing loss.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. In an audiometer, apparatus for generating a controlled bandwidth noise signal for selectively masking a test tone, said apparatus comprising:
- an oscillator for generating an essentially pure tone signal of preselectable frequency;
- means interconnected with said oscillator for providing a control signal which varies as a predetermined function of the frequency of said tone signal;
- means for generating a broadband noise signal; and
- means including a variable filter responsive to said control signal for modifying said broadband noise signal to provide a controlled bandwidth noise signal substantially centered on the tone frequency.

2. Apparatus as set forth in claim 1 wherein the bandwidth is substantially equal to a preselected factor times the critical bandwidth for the respective test tone frequency.

3. Apparatus as set forth in claim 2 wherein said factor is about 1.5

4. Apparatus as set forth in claim 1 wherein said oscillator provides a tone signal of substantially constant amplitude.

5. Apparatus as set forth in claim 4 wherein said control signal is a DC voltage and said control signal providing means includes a frequency weighting network to which said tone signal is applied and a rectifier operating on the frequency weighted tone signal to provide said DC control signal.

6. Apparatus as set forth in claim 1 wherein said filter comprises at least one resistance-capacitor stage in which the resistance is a light variable resistor and wherein said control signal energizes a lamp illuminating said light variable resistor.

7. Apparatus as set forth in claim 1 wherein said noise signal is initially generated at a relatively low frequency and is then transposed to the portion of the audio spectrum including the test tone frequency.

8. Apparatus as set forth in claim 7 wherein said noise signal is transposed by modulation with said tone signal.

9. In an audiometer, apparatus for generating a controlled bandwidth noise signal for selectively masking a test tone, said apparatus comprising:
- an oscillator for generating an essentially pure test tone signal of preselectable frequency;
- a variable cutoff, low pass filter;
- means responsive to said tone signal for generating a control signal which varies as a predetermined function of the frequency of said tone signal;
- means for generating a broadband noise signal and for applying said noise signal to said filter to obtain from said filter a noise signal of controlled bandwidth; and
- means for providing a balanced modulation of said tone signal with said controlled bandwidth noise signal to generate a pair of controlled bandwidth noise sidebands centered on the tone frequency with the tone frequency being substantially suppressed.

10. Apparatus as set forth in claim 9 wherein the cutoff frequency of said filter varies substantially in proportion to said test tone frequency.

11. Apparatus as set forth in claim 9 including automatic volume control means for controlling the average amplitude of said noise signal to a substantially preselected level independent of said tone frequency.

12. In an audiometer, apparatus for generating a controlled bandwidth noise signal for selectively masking a test tone, said apparatus comprising:
- an oscillator for generating an essentially pure tone signal of substantially constant amplitude and of preselectable frequency;
- a variable-cutoff low pass filter comprising a light variable resistor and a capacitor;
- a frequency weighting network interconnected with said oscillator for providing from said tone signal an AC signal having an amplitude which varies as a predetermined function of the frequency of said tone signal;
- means for rectifying said AC signal to provide a DC control signal;
- a lamp for illuminating said resistor;

AUDIOMETER EMPLOYING NARROW-BAND NOISE MASKING

BACKGROUND OF THE INVENTION

This invention relates to an audiometer and more particularly to an audiometer providing a controlled bandwidth masking noise signal.

In testing the hearing acuity of one ear, it is necessary to prevent the subject from hearing the test tone through the other ear, if an accurate measurement is to be obtained. This is particularly necessary where the ear being tested is substantially less sensitive than the other ear or where a so-called bone vibrator is being used to test hearing. The usual method of preventing reception of the test tone signal in the other ear is to apply white noise to the other ear at a level which renders it substantially insensitive to the test tone at the amplitude levels encountered during the testing. In prior art systems, however, the noise signal applied for masking was typically quite broadband, that is, the noise signal occupied substantially the entire audio spectrum or was only roughly confined to that portion of the spectrum which included the test tone frequency. In other words, the white noise source was filtered by a manually selected fixed filter under the control of audiometer operator.

As is understood, only those frequencies within a fairly narrow "critical bandwidth" are effective in masking a given test tone frequency. Further, the "critical bandwidth" varies as a function of the test frequency itself, being roughly proportional to the test frequency. If a broadband noise signal is employed for masking, only the portion of the total acoustic power within the critical bandwidth is effective for masking and the portions outside the critical bandwidth are wasted. Thus, in order to provide effective masking using broadband noise, a relatively high acoustic power level must be applied to the patient in order to insure complete masking. Using broadband noise, the required acoustic power level may cause substantial discomfort and disorientation to the test subject. On the other hand, the masking signal cannot be too narrowly restricted around the test frequency or the noise signal itself may be confused with or become indistinguishable from the test tone.

Among the several objects of the present invention may be noted the provision of an audiometer which includes apparatus for generating a masking noise signal of controlled bandwidth; the provision of such apparatus in which the noise bandwidth is a function of the critical bandwidth for the respective test tone frequency; the provision of such apparatus in which the noise bandwidth is automatically controlled as a function of test tone frequency; the provision of such apparatus in which the masking noise signal comprises a pair of sidebands centered on the test tone frequency, with the tone frequency being substantially suppressed; and the provision of such apparatus which is easy to use, which is reliable and which is relatively simple and inexpensive. Other objects and features will be in part apparent and in part pointed out hereinafter.

SUMMARY OF THE INVENTION

An audiometer according to the present invention employs apparatus for generating a controlled bandwidth noise signal for selectively masking a test tone, the test tone being generated by an oscillator which provides an essentially pure tone signal of preselectable frequency. Means are interconnected with the oscillator for providing a control signal which varies as a predetermined function of the frequency of the tone signal. This control signal is applied to means including a variable filter which modifies the broadband noise signal as a function of the control signal to provide a controlled bandwidth noise signal, centered on the tone frequency.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
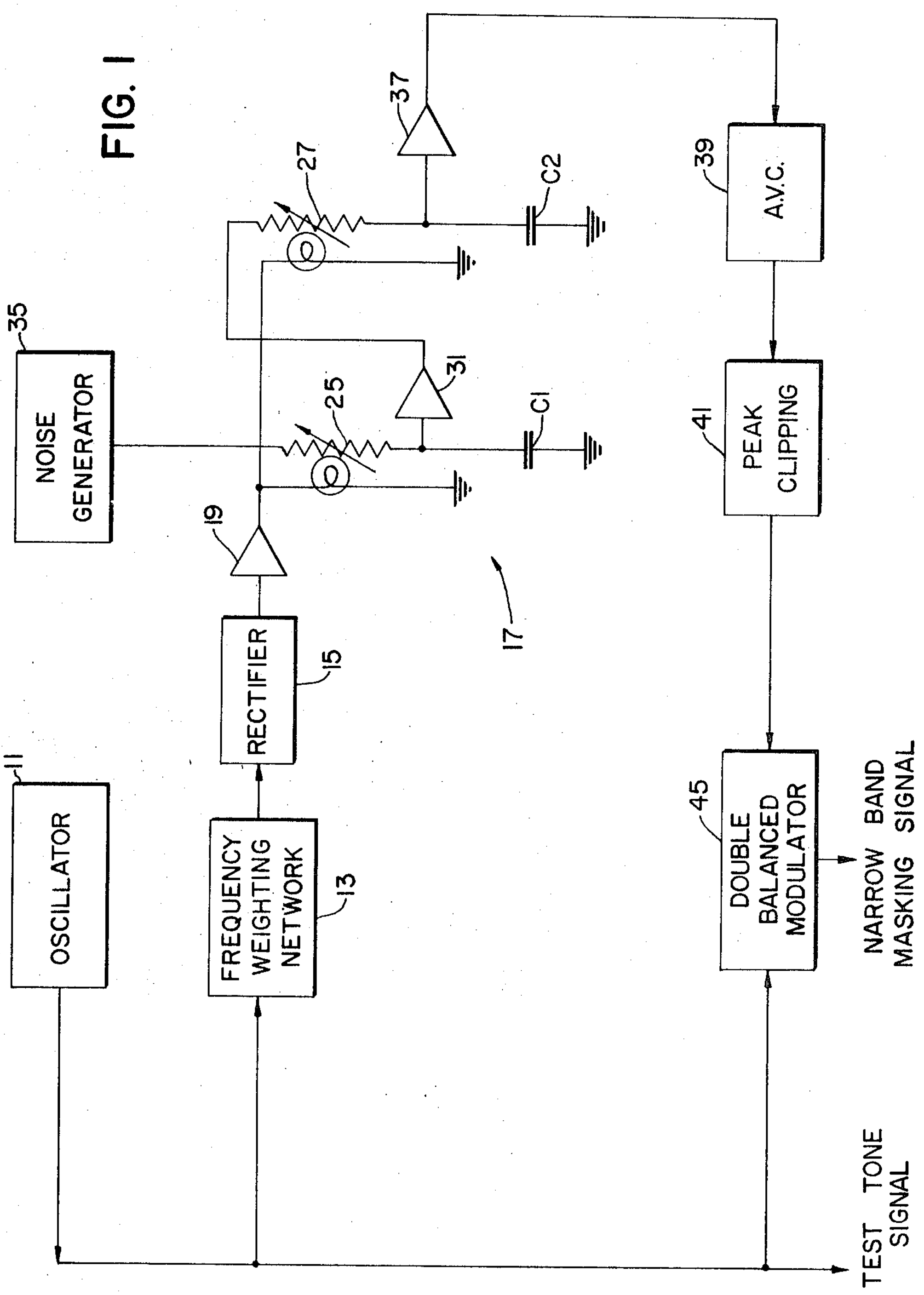
FIG. 1 is a somewhat schematic block diagram of controlled bandwidth noise generating apparatus according to this invention.

Referring now to FIG. 1, there is indicated at 11 an oscillator for generating an essentially pure test tone signal of preselected frequency. Preferably, oscillator 11 is continuously adjustable throughout the audio range.

As noted previously, the critical noise bandwidth for masking a given test tone varies as a function of the frequency of the test tone signal. As a first approximation, the critical bandwidth is substantially proportional to the test tone frequency. In the embodiment of FIG. 1, the output signal from the oscillator 11 is applied to a frequency-weighting network 13, e.g., a 6 db. per octave high pass filter. The amplitude of the AC output signal from the filter network 13 is thus roughly proportional to its frequency. This frequency-weighted signal is rectified, as indicated at 15, to provide a DC control signal having a voltage which is substantially proportional to the output frequency of the oscillator 11.

The DC control signal is applied to a variable cutoff, low pass filter indicated generally at 17. In the filter 17, the DC control signal is amplified, as indicated at 19 and is employed to variably energize a pair of lamps 21 and 23, each of which is associated with a respective photocell or light-variable resistor, 25 and 27 respectively. Such lamp-photocell combinations are available commercially from several sources.

Each light-variable resistor 25 and 27 is interconnected with a respective filter capacitor C1 and C2 so as to provide a 6 db. per octave filter stage. As illustrated, the two filter stages are cascaded, a signal taken from between the light-variable resistor 25 and the capacitor C1 being applied to the light-variable resistor 27 through a buffering amplifier 31. The output signal from the overall filter 17 is taken from between the light-variable resistor 27 and the capacitor C2. As will thus be understood by those skilled in the art, the two filter stages taken together comprise a variable-cutoff, low pass filter, the cutoff frequency being variable as a function of the amplitude of the DC control signal obtained from the rectifier 15. If desired a DC component can be added to the control signal to maintain a minimum bandwidth noise signal at low test tone frequencies.

Figure 2:
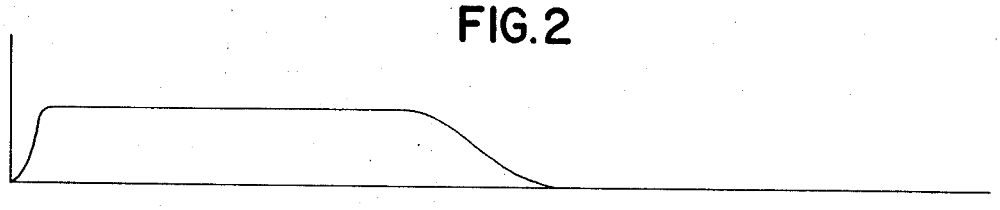
FIGS. 2–4 are graphs representing the frequency spectrums of signals occurring in the FIG. 1 apparatus.

A noise generator 35 provides a broadband noise signal which is applied to the input of the variable cutoff filter 17. For use in the audiofrequency range involved in audiometry, a convenient source of noise is the thermal noise generated in a high value resistor, the noise being amplified and subjected to automatic gain control so that the output signal from the noise generator 35 is at substantially constant amplitude and power level. Such a broadband noise spectrum is represented in FIG. 2.

Figure 3:
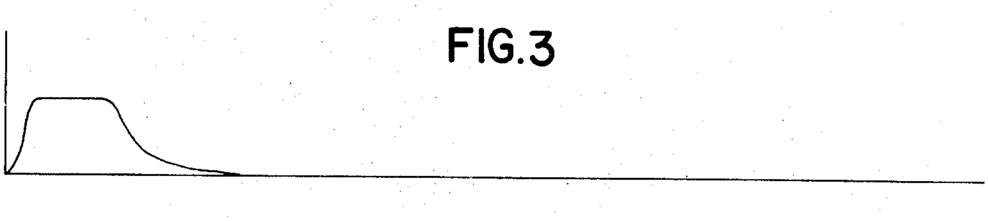
Figure 4:
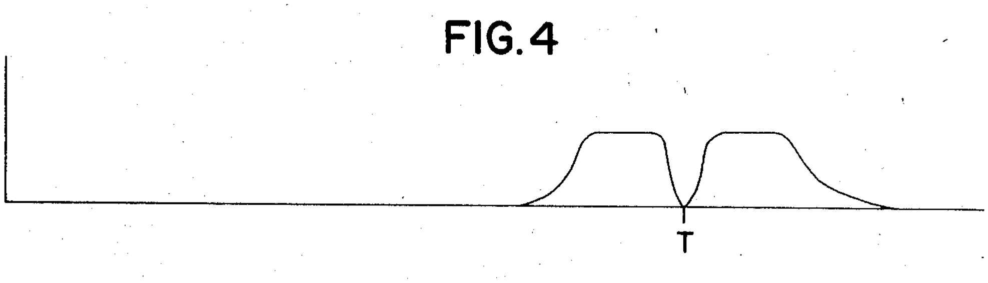
Figure 5:
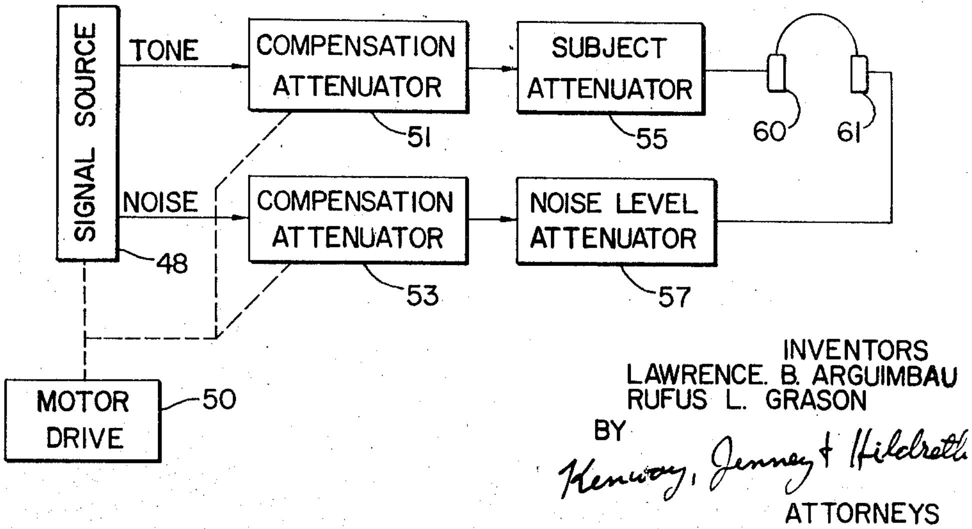
FIG. 5 is a block diagram of an audiometer system employing the noise signal generating apparatus of FIG. 1.

The output signal from the variable cutoff filter 17 is amplified as indicated at 37, and is then applied to an automatic volume control circuit 39 and to a peak limiter or clipping circuit 41. The signal thereby obtained is thus a constant amplitude noise signal of controlled bandwidth, the bandwidth being variable as a function of the DC control signal applied to the variable cutoff filter 17. This controlled bandwidth noise spectrum is represented in FIG. 3.

The controlled bandwidth noise signal and the original test tone signal obtained from oscillator 11 are applied as the two input signals to a doublebalanced modulator circuit 45. The modulator 45 may, for example, comprise a ring modulator circuit or a multiplier circuit, e.g., of the type available commercially for analog computation use.

As will be understood by those skilled in the art, the operation of the doubly balanced modulator is to generate an output signal having components whose frequencies are equal to the cross products of the test tone frequency and the various means for energizing said lamp as a function of said DC control signal thereby to adjust the cutoff of said filter as a function of the test tone frequency;

means for generating a broadband noise signal and for applying said noise signal to said filter to obtain from said filter a low frequency noise signal of controlled bandwidth; and means for providing a balanced modulation of said tone signal with said low-frequency noise signal to generate a pair of controlled bandwidth noise sidebands centered on the tone frequency with the tone frequency and the low-frequency noise signal being substantially suppressed.

13. In an audiometer, apparatus for generating a controlled bandwidth noise signal for selectively masking a test tone, said apparatus comprising:

an oscillator for generating an essentially pure test tone signal of preselectable frequency;

a variable cutoff, low pass filter;

means for adjusting the cutoff of said filter as a function of the frequency selected for generation by said oscillator; and means for generating a broadband noise signal and for applying said noise signal to said filter to obtain from said filter a noise signal of controlled bandwidth; and means for providing a modulation of said tone signal with said controlled bandwidth noise signal to generate a pair of controlled bandwidth noise sidebands centered on the tone frequency.

* * * * *

FO-1050
(5/69)

UNITED STATES PATENT OFFICE
CERTIFICATE OF CORRECTION

Patent No. 3,647,968 Dated March 7, 1972

Inventor(s) Lawrence B. Arguimbau & Rufus L. Grason

It is certified that error appears in the above-identified patent and that said Letters Patent are hereby corrected as shown below:

In Claim 9, column 4, after line 45, insert --means for adjusting the cutoff of said filter as a function of said control signal;--.

Signed and sealed this 5th day of September 1972.

(SEAL)
Attest:

EDWARD M.FLETCHER,JR.
Attesting Officer

ROBERT GOTTSCHALK
Commissioner of Patents